(12) United States Patent
Steeneken et al.

(10) Patent No.: US 8,194,386 B2
(45) Date of Patent: Jun. 5, 2012

(54) ARRANGEMENT OF MEMS DEVICES HAVING SERIES COUPLED CAPACITORS

(75) Inventors: Peter G. Steeneken, Valkenswaard (NL); Kevin R. Boyle, Horsham (GB); Antonius J. M. De Graauw, Haelen (NL); Theodoor G. S. M. Rijks, Eindhoven (NL); Jozef T. M. Van Beek, Rosmalen (NL)

(73) Assignee: EPCOS AG, Munich (DE)

( * ) Notice: Subject to any disclaimer, the term of this patent is extended or adjusted under 35 U.S.C. 154(b) by 874 days.

(21) Appl. No.: 12/158,668

(22) PCT Filed: Dec. 18, 2006

(86) PCT No.: PCT/IB2006/054929
§ 371 (c)(1),
(2), (4) Date: Sep. 15, 2008

(87) PCT Pub. No.: WO2007/072407
PCT Pub. Date: Jun. 28, 2007

(65) Prior Publication Data
US 2009/0237858 A1  Sep. 24, 2009

(30) Foreign Application Priority Data
Dec. 22, 2005  (EP) .................................. 05112831

(51) Int. Cl.
*H01G 5/00* (2006.01)
(52) U.S. Cl. ........ 361/277; 361/272; 361/273; 361/278; 361/279; 361/292

(58) Field of Classification Search ........... 361/272–773
See application file for complete search history.

(56) References Cited

U.S. PATENT DOCUMENTS

| 5,051,643 A | 9/1991 | Dworsky et al. |
| 5,227,748 A | 7/1993 | Sroka |
| 5,880,921 A | 3/1999 | Tham et al. |

(Continued)

FOREIGN PATENT DOCUMENTS

JP  2000-100659 A  4/2000

(Continued)

OTHER PUBLICATIONS

Dec, A., et al., "RF Micromachined Varactors With Wide Tuning Range," 1998 IEEE MTT-S Digest, 1998, pp. 357-360, IEEE.

*Primary Examiner* — Nguyen T Ha
(74) *Attorney, Agent, or Firm* — Slater & Matsil, L.L.P.

(57) ABSTRACT

A tuneable capacitor arrangement for RF use has two series coupled MEMS variable capacitors (C1,C2;C4,C5,C6,C7), varied according to a control signal. The series coupling enables the capacitor to withstand a higher voltage since this is shared by the individual capacitors in a series coupled arrangement. An increase in size of electrodes for each capacitor is compensated by a reduction in size of the springs supporting movable electrodes. These springs can have a larger stiffness value since the capacitance is larger. This means shorter springs, which can also result in a reduction in problems of stiction, resistance, and slow switching. The capacitances have a fixed and a movable electrode, with the RF signal coupled to the fixed electrode to avoid the springs needing to carry an RF signal. This can reduce the problems of inductance and resistance in the springs.

21 Claims, 3 Drawing Sheets

U.S. PATENT DOCUMENTS

| | | |
|---|---|---|
| 5,959,516 A | 9/1999 | Chang et al. |
| 6,094,102 A | 7/2000 | Chang et al. |
| 6,242,989 B1 | 6/2001 | Barber et al. |
| 6,426,687 B1 | 7/2002 | Osborn |
| 6,441,449 B1 | 8/2002 | Xu et al. |
| 6,507,475 B1 | 1/2003 | Sun |
| 6,714,105 B2 | 3/2004 | Eliacin et al. |
| 6,876,482 B2 | 4/2005 | DeReus |
| 6,897,537 B2 * | 5/2005 | de los Santos ............... 257/414 |
| 7,180,145 B2 | 2/2007 | Musalem et al. |
| 7,274,278 B2 | 9/2007 | Weller et al. |
| 7,361,962 B2 | 4/2008 | Plowman et al. |
| 7,385,800 B2 | 6/2008 | Morris, III et al. |
| 7,388,316 B2 | 6/2008 | Musalem et al. |
| 7,446,628 B2 | 11/2008 | Morris, III |
| 7,446,994 B2 * | 11/2008 | Shimanouchi et al. ....... 361/278 |
| 7,495,529 B2 * | 2/2009 | Miyaguchi et al. ........... 333/164 |
| 7,586,164 B2 | 9/2009 | Musalem et al. |
| 2004/0075158 A1 | 4/2004 | Nakayama |
| 2006/0012343 A1 | 1/2006 | Gallant |
| 2006/0055287 A1 | 3/2006 | Kawakubo et al. |

FOREIGN PATENT DOCUMENTS

| | | |
|---|---|---|
| JP | 2003-124063 A | 4/2003 |
| WO | WO 2004/000717 A2 | 12/2003 |

* cited by examiner

ARRANGEMENT OF MEMS DEVICES HAVING SERIES COUPLED CAPACITORS

This invention relates to tuneable capacitors using MEMS devices, to integrated circuits incorporating such apparatus, and to corresponding methods of manufacture and use.

The term 'MEMS' (Micro-electromechanical system or structure or switch) can encompass various devices. A common arrangement of a MEM device comprises a freestanding beam with a first electrode located opposite a second electrode. The first and the second electrode are mutually separated by an air gap. The first electrode can be moved towards or away from the second electrode by application of an actuation voltage to provide an electrostatic force (in principle other forces could be used such as an inductive force, or a thermal expansion force).

Some common applications are:
use as a microphone or a loudspeaker; (using a specific type of membrane)
use as a sensor, particularly an air pressure sensor
use as a resonator
use as pixel switches in a display, or driving a mirror for an optical switch,
use in RF applications, particularly as a switch or as a variable capacitance. One of the commercially important applications is the use for variable impedance matching with integrated band switching in the front end of a mobile wireless device such as a phone or computer.

An example of a variable capacitor using a MEM device is shown in WO 2004/000717. Here it is explained that the capacitance increases as the gap between the electrodes is reduced. The motion is restricted by a mechanical spring force, which is directly proportional to the distance traveled by the moveable electrode. However the electrostatic attractive force has a non-linear relationship with changes in the gap size as the moveable electrode moves. Thus there is a point when the attractive force overcomes the spring force and the electrodes collapse together. The control voltage at which this occurs is called the "Pull in" voltage $V_{PI}$. This document also explains that this phenomenon limits the capacitance tuning ratio to 1.5 to 1, which is inadequate for many applications. To increase this ratio, it is known to provide separate electrodes for the capacitor and for the electrostatic force, with a smaller gap for the capacitor electrodes. If the gap between the electrodes is reduced to a third of its initial size, then pull in can occur and the electrodes close together. The actuation voltage needs to be dropped further to enable release.

One of the main failure mechanisms of MEMS switches is stiction, in which the beam or membrane doesn't release from the counter electrode when the actuation voltage is removed. Such sticking mainly occurs if there is moisture or foreign matter between the moveable actuating stage and the substrate. Sticking may occur in use or during a manufacturing process. It is known to address stiction using coatings or surface roughness such as dimpling, on the contact surfaces. A stopper can be used to cause a sudden steep increase in the repulsive force of the flexure elements as the gap closes, to give a non-linear restoring force that is capable of effectively preventing a moveable element from sticking.

Even if there is no moisture or foreign matter in the gap between capacitor or switch electrodes, stiction can occur as a result of charge injection into the dielectric layer which prevents dc contact between the moveable and fixed electrode in the closed state. This charge is forced into the dielectric as a result of the electric field generated by the actuation voltage. This charge can cause a force on the moveable electrode, even in the absence of an actuation voltage. If this force is large enough, it can cause stiction. This can be an important mechanism for stiction in capacitive MEMS switches.

FIG. 1 shows a schematic of the mechanical and electrical connections in a conventional capacitive RF MEMS tuneable capacitor. Electrode e1 is fixed on the substrate and electrode e2 is movable with, respect to the substrate and suspended by springs with a total spring constant k. The springs are conducting and provide an electrical connection to an RF source representing the circuit to which the device is applied and a DC source for actuating the MEMS device. On top of the fixed electrode e1 a dielectric layer of thickness $g_d$, is situated with a dielectric constant $e_d$ When the spring is relaxed, there is an air gap with a distance g between the top of the dielectric layer and the bottom of the top electrode e2. FIG. 2 shows a circuit schematic for the same arrangement as FIG. 1. The electrodes e1 and e2 form variable capacitance C3.

To close the electrodes to thereby increase the capacitance, a DC voltage Vdc is applied to electrode e2, whereas electrode e1 is kept at ground potential (or vice versa, electrode e1 and e2 are electrically interchangeable). As the distance between the electrodes becomes smaller, the capacitance becomes larger. The MEMS tuneable capacitor can be used in an RF (radio-frequency) signal electronics circuit. Because it is usually undesirable to have a large DC voltage present in the RF electronics, a DC decoupling capacitor C is needed which takes up considerable chip area. On the other hand, to prevent RF current leaking away through the dc actuation line a large resistor R (or coil L) is needed. A typical value of the resistance of the resistor is R=10 kΩ. The capacitance of a conventional MEMS switch in the open state is $$C_{open} = A\epsilon_0/(g + g_d\epsilon_0/\epsilon_d)$$

in the closed state it is given by:

$$C_{closed} = A\epsilon_d/g_d$$

One of the difficulties in the application of conventional RF MEMS tuneable capacitors in high-power systems is that a force on the top electrode e2 is generated not only by the DC actuation voltage but also by the RF voltage across the switch. In fact if Vdc=0 the force on the top electrode is proportional to $(V_{RFrms})^2$ If the RF signal is a sine wave, its square always has a DC component. Thus if the rms RF voltage exceeds the pull-in voltage of the switch ($V_{RF\ rms} > V_{PI}$) undesired pull-in can occur even though no dc voltage is applied to the switch—This is especially an issue in high power high impedance circuits where the RF voltage is high, for example, near the antenna of a mobile phone, (z=50Ω).

Another disadvantage of conventional MEMS with small capacitances is the size of the springs used to support the movable electrode. Usually there is a limit on the minimum width w and thickness t of the springs that can be manufactured in a certain MEMS process, also the gap g is fixed. Therefore the length L of the springs is the main parameter to tune the spring constant k. Because the spring constant k is approximately proportional to $wt^3/L^3$ very compliant springs can only be made by designing them to be very long The pull-in voltage of a conventional MEMS switch is given by:

$$V_{PI}^2 = \frac{8\ kg^3}{27A\epsilon_0}$$

If one wants to design several MEMS capacitors with different capacitance values but with the same pull-in voltage, it tends to be difficult to get a good design for the small MEMS capacitors for 4 reasons:
1. For a small capacitance a small area is required, therefore very compliant springs with a very low value of k are required. Because these springs need to be very long they occupy a lot of area, which is not cost efficient.
2. Long springs add a significant series resistance and series inductance to the capacitor, which is undesirable, especially when the springs carry an RF signal.
3. Moreover, a device with springs with a small spring constant is much more sensitive to failure due to stiction of the device in the closed state. Failure occurs when the stiction forces are larger than the spring forces.

$$F_{stiction} > F_{spring} = kg$$

Physical origins for stiction forces are charges trapped in the dielectric, van der Waal forces between the surfaces or capillary forces in the presence of moisture between the electrodes.
4. Small values of k increase the switching time, i.e. resulting in slow switching.

A disadvantage of a conventional decoupling capacitor C is that it reduces the capacitance tuning range of a MEMS capacitor. Without the decoupling capacitor C, the tuning range is:

$$\alpha_{MEMS} = C_{closed}/C_{open} = (\epsilon_d g/(\epsilon_d g_d)) + 1$$

With the decoupling capacitor C the tuning range is:

$$\alpha_{MEMS+C} = \alpha_{MEMS} * (C_c/C_{open} + 1)/(C/C_{open} + \alpha_{MEMs})$$

It is often difficult to achieve a large tuning range in a MEMS device with a large value of capacitance and therefore it is even more undesirable if the effective tuning range is reduced further by a decoupling capacitor.

An object of the invention is to provide improved to apparatus having tuneable capacitors in MEMS devices, to integrated circuits incorporating such apparatus, and to corresponding methods of manufacture and use. According to a first aspect, the invention provides:

A tuneable capacitor arrangement having two or more variable capacitors, each variable capacitor having a movable electrode and a micro-electromechanical structure for moving the movable electrode to vary its capacitance according to a control signal, the variable capacitors being coupled electrically in series.

The series coupling enables the capacitor arrangement to withstand a higher voltage since the voltage across each of the individual capacitors is reduced because the drive voltage is shared by the individual capacitors when in a series coupled arrangement. This arrangement would cause an undesirable increase in size of electrodes for each capacitance compared to the arrangement of FIG. 1, but this is at least partly preferably compensated by a reduction in size of the micro electromechanical structures such as springs which can have a higher value of stiffness since the capacitance is larger, and because actuator electrodes can be larger. Higher stiffness implies shorter springs. In turn this can result in a reduction of at least one of the above mentioned problems of stiction, resistance, and slow switching.

An additional feature of some embodiments is the tuneable capacitor arrangement being adapted for use with an RF signal and having a connection suitable for coupling the RF signal across the series coupled variable capacitors. This is a particularly valuable field of application.

The arrangement can also be a capacitive switch especially an RF capacitive switch.

An additional feature of some embodiments is at least the first or last of the variable capacitors in the series having a fixed electrode, arranged such that the RF signal is coupled to the fixed electrode. This can help avoid or reduce the need for the micro-electromechanical structure to carry an RF signal and hence can reduce the problems caused by inductance and resistance in such structures.

An additional feature of some embodiments is at least some of the variable capacitors having the control signal coupled to one or both electrodes of the given variable capacitor, to thereby use the electrodes as actuation electrodes as well as capacitance electrodes. This enables better use of limited space.

An additional feature of some embodiments is a shared movable electrode and a shared micro electromechanical structure provided for the two or more of the variable capacitors. This enables the structure to be made smaller, since there need be fewer supports. Also a spring constant can be reduced since there is twice the actuation force, so each support can be smaller. Series electrical resistances of the supports will therefore be smaller.

An additional feature of some embodiments is the variable capacitors having substantially similar dimensions. This helps maximize the voltage handling capability and therefore the power handling capability.

An additional feature of some embodiments is a coupling between variable capacitors in the series, for coupling a DC voltage as a control signal. This enables the DC voltage to be separated from the RF by the variable capacitors, and avoids the need for a separate decoupling capacitor.

Another additional feature of some embodiments is more than two variable capacitors in series and circuitry for applying the same dc control voltage across each of the variable capacitors. This enables even greater voltage handling than two variable capacitances in series, and a common control voltage helps simplify the control.

Another aspect provides an RF integrated circuit having one or more of the tuneable capacitor arrangements.

Another aspect provides a method of manufacturing such an integrated circuit.

Another aspect provides a method of tuning using such an integrated circuit.

Any of the additional features can be combined with each other and with any aspect of the invention. Other advantages will be apparent to those skilled in the art, especially compared to other prior art. Numerous variations and modifications can be made without departing from the scope of the claims of the present invention. Therefore, it should be clearly understood that the form of the present invention is illustrative only and is not intended to limit the scope of the present invention. How the present invention may be put into effect will now be described by way of example with reference to the appended schematic drawings.

The features of the invention will be better understood by reference to the accompanying drawings, which illustrate preferred embodiments of the invention. In the drawings.

Figure 1:
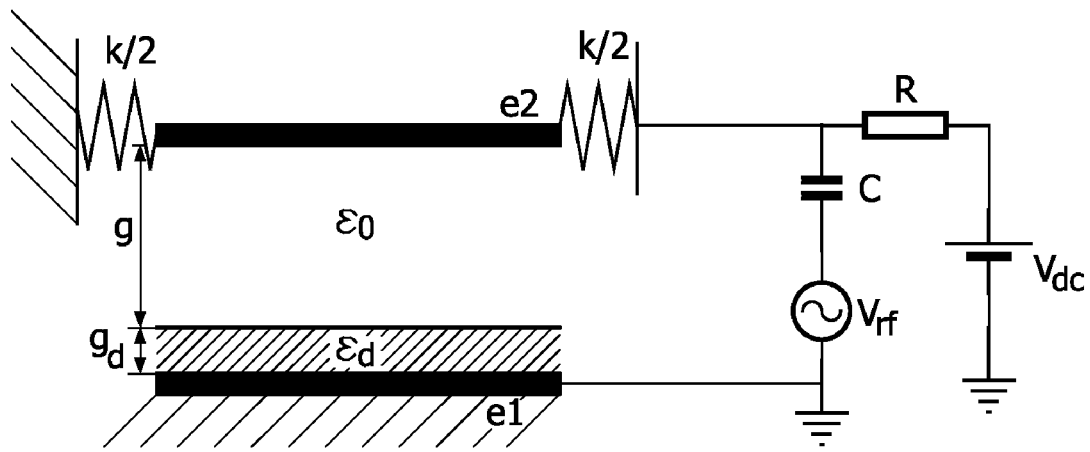
FIGS. 1 and 2 show known arrangements.

The present invention will be described with respect to particular embodiments and with reference to certain drawings but the invention is not limited thereto but only by the claims. Any reference signs in the claims shall not be construed as limiting the scope. The drawings described are only schematic and are non-limiting. In the drawings, the size of some of the elements may be exaggerated and not drawn on scale for illustrative purposes. Where the term "comprising" is used in the present description and claims, it does not exclude other elements or steps. Where an indefinite or definite article is used when referring to a singular noun e.g. "a" or "an", "the", this includes a plural of that noun unless something else is specifically stated.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Figures 2, 3:
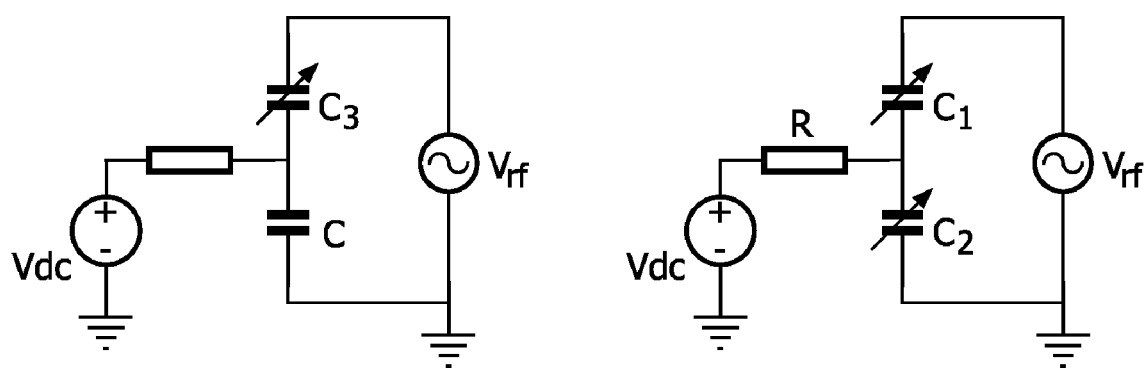
FIG. 3 shows a schematic view of an embodiment of a tuneable capacitor.

The embodiments described enable some of the drawbacks of conventional capacitor arrangements, and in particular of conventional RF-capacitive switches having decoupling capacitors. The present invention has the advantage of enabling a better combination of higher tuning range and higher voltage handling in the open state, e.g. to reduce risk of RF pull-in. FIG. 3 shows an example of a tuneable capacitor arrangement in accordance with an embodiment of the present invention in the form of two variable RF-MEMS capacitors C1 and C2 in series. Each of these can have a structure as shown in FIG. 1, or any other type of MEMS variable capacitance structure. A DC voltage source is used to control the capacitors. It is coupled through an impedance such as a resistor R to a point between the variable capacitors. Instead of a resistor R an inductor such as a coil or a transistor configured as a resistor can be used. According to the application, the DC voltage source can be controlled to switch between two or more preset levels or may output an analog signal within a given range. When dimensioned such that the values of the capacitors has the relationship C1=C2=2C, this device has an equal tuning range as the conventional MEMS device of FIG. 2. However the voltage handling has doubled and the power handling quadrupled. Other dimensioning is also possible, and may still be better than the conventional RF-MEMS device.

An improvement in RF pull in will now be explained. Usually the decoupling capacitor C is chosen such that it's capacitance is bigger than $C3_{closed}$ of the MEMS switch, because otherwise the tuning range is severely compromised as discussed above. However on the other hand this implies that most of the RF voltage will be across the MEMS capacitor when it is in the open state ($C>>C3_{open}$) and RF-pull-in can occur as described above. If $C>>C3_{open}$ and C1=C2=2C3 the total RF capacitances and capacitance tuning ranges of both circuits are equal, performing the same function. However in the open state the RF voltage across the MEMS capacitor C3 is twice as high as that across capacitors C1 and C2. This implies that the circuit of FIG. 3 has twice the voltage handling capability and 4 times the power handling capability P, because $P=V_{rf}^2/Z$ (at a characteristic impedance Z).

If C1 and C2 are not identical the power handling capacity of the circuit will reduce slightly but will still be better than the circuit of FIG. 2. Note that the circuit of FIG. 3 still has maximum capacitance tuning range $\alpha_{total}=\alpha_{MEMS}$ opposed to the known circuit in which the decoupling capacitor always reduces the tuning range (as discussed above). If the capacitance density of the decoupling capacitor is higher than that of the closed MEMS capacitors, the conventional solution takes less chip area for the capacitor electrodes at least. If the capacitance densities are equal, both solutions use the same space. On the other hand if $C>>C3_{open}$ and C1=C2=2C3, the area of the MEMS devices C1 and C2 is twice as big as that of C3, therefore problems with springs indicated above are less likely to occur and the total area occupied by the springs will be lower for C1 and C2.

Figure 4:
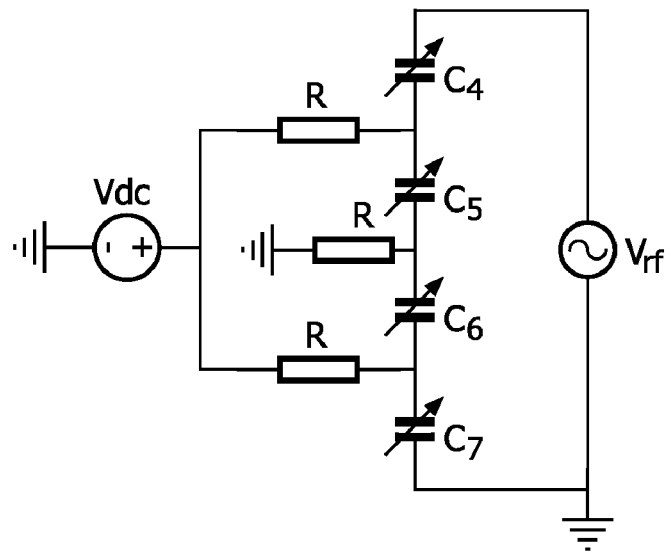
FIG. 4 shows a schematic view of another embodiment.

FIG. 4 shows a schematic view of another embodiment. In this case, there are 4 series coupled variable MEMS capacitors C4, C5, C6 and C7, with 4 times better power handling capability than the configuration of FIG. 3. There are now three intermediate nodes in between the variable capacitances. To maintain the same control voltage across each of them, a central node in the series is grounded through a connection such as a resistor R, and the upper and lower intermediate nodes are coupled to the DC voltage through an impedance such as resistors R. For the same effective capacitance the total capacitance (and area) needs to be 4 times bigger. To improve the voltage handling capability even more, this arrangement can be extended further, by putting more than 4 variable capacitances in series for even better power handling.

Figure 5:
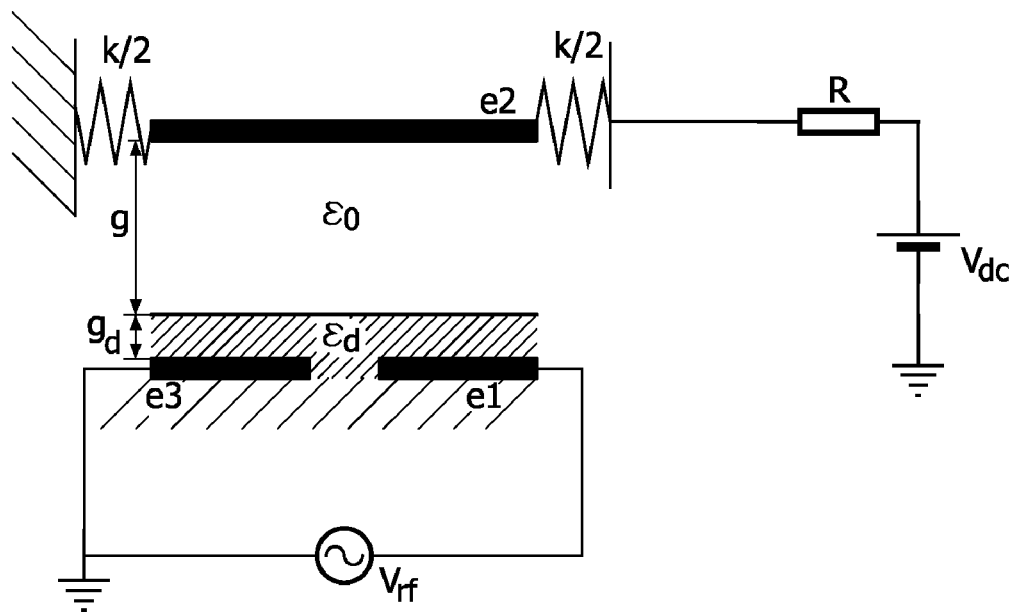
FIG. 5 shows a cross section view of another embodiment.

FIG. 5 shows a cross section view of an embodiment of a capacitor arrangement having two variable capacitors coupled in series and a number of additional useful features. The two variable MEMS capacitors C1 and C2 are located next to each other and share a common movable electrode e2. The capacitors C1 and C2 are therefore arranged in series. The common or shared movable electrode has supports in the form of springs k/2, allowing movement to close the gap $\epsilon_0$. Separate fixed electrodes e1 and e3 are provided on a substrate, and a dielectric layer $\epsilon_d$ on the fixed electrodes. The device has all the advantages of FIG. 3 discussed above and has the following additional advantages:

1. Because the top electrode is shared between the capacitors C1 and C2 the (electrical) distance between C1 and C2 is minimized, thus minimising series resistance and inductance of the device. This advantage would also apply to an alternative in which the lower fixed electrode is shared instead of the movable electrode being shared.

2. Because the capacitors share their movable electrode, no RF power needs to flow through the springs (unlike FIG. 1), minimizing series resistance and inductance even more. This advantage would not apply to the alternative mentioned above in item 1.

3. Because the electrostatic force of both capacitors is used to move the same top electrode, for the same pull-in voltage the spring constant k can be twice as high as for C1 and C2 in FIG. 2 and even 4 times as high as for C3 in FIG. 2 (assuming $C>>C3_{open}$). This further reduces the size, the stiction, and speed of tuning problems indicated above. This advantage would apply to the alternative mentioned above.

Figure 6:
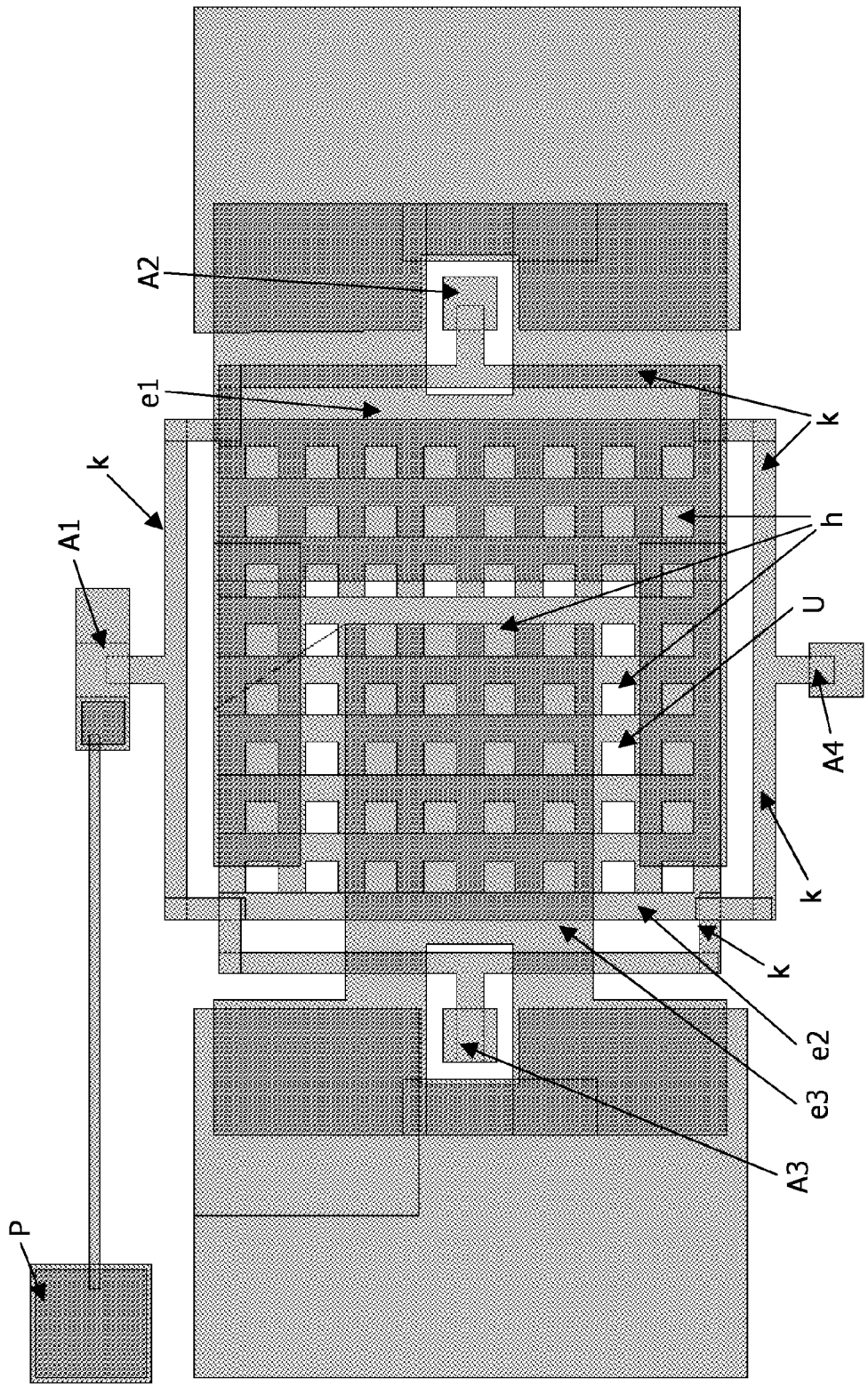
FIG. 6 shows a plan view of an embodiment corresponding to FIG. 5.

FIG. 6 shows a plan view of electrodes and MEMS structures corresponding with the cross-section of FIG. 5. The dark grey hatched membrane with holes h is the movable electrode e2. It is electrically connected to the Vdc actuation pad P via the one or more springs k made of conductive material. The minimum number of springs k is one assuming a single anchor point A1-A4 on the substrate. However more than one spring can be used, e.g. two, three, four springs, etc. For example, each spring may be attached to one side of a polygonal moveable electrode e2. However, the present invention is not limited to polygonal electrodes. The electrode shape may be any suitable one and may include circular or oval shapes for example. Further each spring may include more than one spring element. For example each spring may include one, two or more arms. In the example shown in FIG. 6, four springs k are shown in a configuration having two arms attached to each of the four corners of the square shaped movable electrode e2. Each arm is anchored at one end thereof to one of four square shaped anchors A1-A4 shown at midpoints of the sides. Many other configurations are possible and are included within the scope of the present invention. The light grey shaded areas below electrode e2 are the fixed electrodes e1 and e3. They are shown with complementary shapes to fill the area below e2 and having a U shaped margin U between them that is visible through the holes of electrode e2 as white areas. Again many other configurations are possible. When the arrangement is used as a capacitor a dielectric layer (not shown) is applied between the bottom electrodes, e1, e3 and the top moveable electrode e3. For example, the dielectric layer is applied over the bottom electrodes e1 and e3.

The movable electrode e2 is shown with an array of holes h for the purpose of reducing weight and air resistance to increase tuning speed. The speed of switching of a MEMS device is usually strongly reduced by air damping. The closing speed of an electrostatic device can be increased by applying a higher actuation voltage. However as the electrostatic force is always attractive, the opening speed is purely determined by the spring constant of the structure and the air damping. For a MEMS switch (where the dimensions of the membrane area are usually much larger than the gap distance) the dominant air damping force is the squeeze film damping force which is given by: $F_{sfd} = b_0 v/z^3$ where v is the speed and z is the distance between the electrodes. The constant $b_0$ can be reduced by providing the holes.

Conventional processes can be used to form the micromechanical structures. Although described with regard to elements movable perpendicular to a substrate, in principle the movement can be parallel or have a component parallel. Two common constructions are as follows:
1. A MEMS structure in a substrate of silicon. In this case the electrodes are oriented perpendicular to the substrate surface. This construction is typically used for sensor and for resonator applications (other applications are not excluded).
2. A MEMS structure as a thin-film element. The beam is here oriented substantially parallel to the substrate. This type of MEMS structure is typically used for RF MEMS. There are at least two constructions for the beam:
 a double clamped beam (a beam that is connected to the substrate surface at two or more sides, so the deflection to the substrate occurs in the centre of the beam)
 a single clamped beam (in which case the deflection to the substrate occurs at the end of the beam).

The beam is generally provided with holes, provided for the etching of the sacrificial layer between the beam and the substrate to create the air gap. The etchant may be a liquid or gas etchant. These holes also help to reduce air damping by allowing air to flow in and out of the cavity between beam and substrate, while opening or closing the beam. However there are manufacturing techniques in which the beam is assembled to the substrate, so no holes are needed for the etching It is also possible to use a beam that is an intermediate layer between a top electrode and a bottom electrode.

Summarising the above, a tuneable capacitor arrangement using RF MEMS devices coupled in series with associated electrical circuitry has been described. The embodiments have at least one, some or all of the following advantages over the arrangement of FIG. 1:
1. Better power/voltage handling.
2. Larger tuning range.
3. Less sensitivity to stiction, especially for small capacitors
4. Lower series inductance and resistance, especially for small capacitors.
5. Smaller total size for making small capacitance values (springs take less area).

Some of these advantages are less apparent for devices having large capacitance values (for example approximately >5 pF), because then the larger area than the conventional solution may predominate. Nevertheless for such larger devices, it may be useful for applications needing a low ESR (Equivalent Series Resistance, the characteristic representing the sum of resistive (ohmic) losses within a capacitor, power dissipation and noise suppression characteristics will be related directly to the ESR). Thus it can be useful for applications such as antenna matching, band switching and other uses in adaptive antennas for mobile phones, particularly where it is important to be able to handle high RF voltages without pull-in. Other applications include any RF signal electronics or high-power RF systems, or other mobile phone circuitry or wireless mobile computing devices for example. MEMS capacitor devices may be produced which may be used for development of different programmable devices, both linear and non-linear, high-frequency circuits (LNA, mixers, VCO, PA, filters, etc.), e.g. in re-configurable radio systems.

Further applications are:
 use in a microphone or a loudspeaker; (using a specific type of membrane)
 use in a sensor, particularly an air pressure sensor
 use in a resonator
 use in pixel switches in a display, or driving a mirror for an optical switch,
 use in RF applications, particularly as a switch or as a variable capacitance.

The invention claimed is:

1. A tuneable capacitor arrangement having two or more variable capacitors, each having a movable electrode and a micro-electromechanical structure for moving the movable electrode to vary a capacitance according to a control signal, and the variable capacitors being coupled in series.

2. The tuneable capacitor arrangement of claim 1, the tuneable capacitor arrangement being adapted for use with an RF signal and having a connection for coupling the RF signal across the series coupled variable capacitors.

3. The tuneable capacitor arrangement of claim 2, wherein at least a first or last of the variable capacitors in the series has a fixed electrode arranged such that the RF signal is coupled to the fixed electrode.

4. The tuneable capacitor arrangement of claim 1, wherein at least some of the variable capacitors have the control signal coupled to one or both electrodes of the given variable capacitor, wherein the electrodes are used as actuation electrodes as well as capacitor electrodes.

5. The tuneable capacitor arrangement of claim 1, wherein the two or more variable capacitors have a shared movable electrode and a shared micro electromechanical structure.

6. The tuneable capacitor arrangement of claim 1, wherein the two or more variable capacitors have substantially similar dimensions.

7. The tuneable capacitor arrangement of claim 1, further comprising a coupling between variable capacitors in the series, for coupling a DC voltage as the control signal.

8. The tuneable capacitor arrangement of claim 1, wherein the two or more variable capacitors comprise more than two variable capacitors in series, the arrangement further comprising circuitry for applying the same DC control voltage across each of the variable capacitors.

9. An RF integrated circuit having one or more of the tuneable capacitor arrangements of claim 1.

10. A method of tuning using the integrated circuit of claim 9, having the step of setting the control signal to vary the capacitors.

11. A method of manufacturing an integrated circuit, the method comprising forming two or more variable capacitors, each having a movable electrode and a micro-electromechanical structure for moving the movable electrode to vary a capacitance according to a control signal, wherein the variable capacitors are formed to be coupled in series.

12. A tuneable capacitor arrangement comprising:
a first fixed electrode;
a second fixed electrode laterally spaced from the first fixed electrode;
a moveable electrode adjacent both the first fixed electrode and the second fixed electrode; and
a control signal node coupled to the moveable electrode, wherein a control signal applied to the control signal node varies a capacitance between the moveable electrode and the first fixed electrode and between the moveable electrode and the second fixed electrode.

13. The tuneable capacitor arrangement of claim 12, further comprising an RF signal source coupled to the first fixed electrode and the second fixed electrode.

14. The tuneable capacitor arrangement of claim 12, further comprising:
a third fixed electrode laterally spaced from the second fixed electrode;
a fourth fixed electrode laterally spaced from the third fixed electrode; and
a second moveable electrode adjacent both the third fixed electrode and the fourth fixed electrode.

15. The tuneable capacitor arrangement of claim 14, wherein the second moveable electrode is coupled to the control signal node.

16. The tuneable capacitor arrangement of claim 15, further comprising a first resistor coupled between the control signal node and the moveable electrode and a second resistor coupled between the control signal node and the second moveable electrode.

17. The tuneable capacitor arrangement of claim 16, further comprising an RF signal source coupled between the first fixed electrode and the fourth fixed electrode.

18. The tuneable capacitor arrangement of claim 12, wherein the moveable electrode substantially overlies both the first fixed electrode and the second fixed electrode.

19. The tuneable capacitor arrangement of claim 12, wherein the first fixed electrode has substantially the same dimensions as the second fixed electrode.

20. The tunable capacitor arrangement of claim 12, wherein moveable electrode is located related to the first and second fixed electrodes so as to form a first variable capacitor between the first fixed electrode and the moveable electrode and a second variable capacitor between the second fixed electrode and the moveable electrode, wherein the control signal applied to the control signal node to vary the capacitance between the moveable electrode and the first fixed electrode and between the moveable electrode and the second fixed electrode is the same direction.

21. A tuneable capacitor arrangement having two or more variable capacitors, each having a movable electrode and a micro-electromechanical structure for moving the movable electrode to vary a capacitance according to a control signal, and the variable capacitors being coupled in series, wherein the tuneable capacitor arrangement is adapted for use with an RF signal and having a connection for coupling the RF signal across the series coupled variable capacitors and wherein at least some of the variable capacitors have the control signal coupled to one or both electrodes of the given variable capacitor, wherein the electrodes are used as actuation electrodes as well as capacitor electrodes.

* * * * *